(12) United States Patent
Kriwet et al.

(10) Patent No.: US 6,687,398 B1
(45) Date of Patent: Feb. 3, 2004

(54) METHOD AND AN APPARATUS FOR THE IDENTIFICATION OF INCORRECTLY ORIENTED PARTS AND/OR PARTS DEPARTING FROM A PREDETERMINED MASTER

(75) Inventors: Ansgar Kriwet, Ostfildern (DE); Herbert Hufnagel, Esslingen (AT)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/402,278

(22) PCT Filed: Feb. 13, 1998

(86) PCT No.: PCT/EP98/00838

§ 371 (c)(1),
(2), (4) Date: Sep. 30, 1999

(87) PCT Pub. No.: WO98/43752

PCT Pub. Date: Oct. 8, 1998

(30) Foreign Application Priority Data

Apr. 2, 1997 (DE) .......................... 197 13 521

(51) Int. Cl.⁷ .................. G06K 9/64; G06K 9/68; G06K 9/00
(52) U.S. Cl. ............... 382/151; 382/217; 382/218; 382/219; 382/220
(58) Field of Search ................ 382/151, 286, 382/287, 288, 289, 209, 217, 218, 219, 220; 348/94, 95, 335; 356/400; 118/697; 29/407.04; 235/462.08

(56) References Cited

U.S. PATENT DOCUMENTS

| | | | | |
|---|---|---|---|---|
| 4,611,347 A | * | 9/1986 | Netravali et al. | 382/159 |
| 4,649,621 A | * | 3/1987 | Dusel et al. | 29/564.4 |
| 4,704,694 A | * | 11/1987 | Czerniejewski | 382/288 |
| 4,809,342 A | * | 2/1989 | Kappner | 235/462.08 |
| 4,876,728 A | * | 10/1989 | Roth | 348/94 |
| 4,941,182 A | * | 7/1990 | Patel | 118/697 |
| 5,046,120 A | | 9/1991 | Bishop | |
| 5,184,733 A | | 2/1993 | Arnarson et al. | |
| 5,185,815 A | * | 2/1993 | Brandstetter | 382/211 |
| 5,353,358 A | * | 10/1994 | Baird et al. | 382/141 |
| 5,506,682 A | * | 4/1996 | Pryor | 356/400 |
| 5,579,444 A | * | 11/1996 | Dalziel et al. | 700/259 |
| 6,011,586 A | * | 1/2000 | Lepior et al. | 348/335 |
| 6,301,763 B1 | * | 10/2001 | Pryor | 29/407.04 |
| 6,330,351 B1 | * | 12/2001 | Yasunaga | 382/141 |

FOREIGN PATENT DOCUMENTS

| | | |
|---|---|---|
| DE | 32 39 938 A1 | 5/1984 |
| DE | 38 42 636 A1 | 6/1990 |
| DE | 44 14 112 A1 | 10/1995 |
| DE | 44 19 461 A1 | 12/1995 |
| DE | 195 16 274 C1 | 11/1996 |
| EP | 0 672 993 A2 | 9/1995 |
| JP | 09178444 | 7/1997 |

\* cited by examiner

Primary Examiner—Samir Ahmed
Assistant Examiner—Brian Le
(74) Attorney, Agent, or Firm—Hoffmann & Baron, LLP

(57) ABSTRACT

A method and a device for the identification of incorrectly orientated parts and/or parts departing from a predetermined master, the parts being moved by means of a conveyor means (13) past at least one camera (18) for registering the shapes of the parts. When there is a preset departure from stored masters values the respective part is identified as being faulty and/or removed. On the basis of image signals of the camera (18) corresponding to the shape of the respective part a plurality of criteria are derived such as overall length, overall height, area, axial position, surface waviness, position of center of gravity. Such individual compared with the corresponding individual criteria derived from at least one master part. This means that with a relatively small memory requirement the parts may be reliably identified and more particularly significant fine structures may be distinguished.

20 Claims, 2 Drawing Sheets

METHOD AND AN APPARATUS FOR THE IDENTIFICATION OF INCORRECTLY ORIENTED PARTS AND/OR PARTS DEPARTING FROM A PREDETERMINED MASTER

The invention relates to a method for the identification of incorrectly orientated parts and/or parts departing from a predetermined master, which by means of a conveying means are moved past at least one camera for registering shapes of the parts, in the case of which given a pre determinable departure from stored master values the respective part is identified as being faulty and/or is removed, and to an apparatus for the performance of the method.

BACKGROUND OF THE INVENTION

In the case of many items of manufacturing equipment, assembly plant, packaging means or the like it is necessary for the parts to be processed to be pre-orientated and to be supplied with the prescribed orientation. The supply of faulty or damaged part or of parts departing from a master or pattern or of non-faulty but incorrectly orientated parts in such further processing by machine frequently leads to damage of the plant itself, to interruptions of production or to other undesired consequences. For this reason it has long been a practice to provide testing means at the input end of such processing means by means of which the correct orientation and/or correct dimensions of the parts may be checked. So-called rejects, which do not pass such a test, are sorted out and only the satisfactory parts are conveyed on farther.

A conventional test means, disclosed for example in the German patent publication 2,628,358 C1, comprises a camera, with the aid of which the shapes of the parts run past the camera by the conveying means are examined. The respectively registered shapes are compared with stored shapes. If they are found to be the same, it is a question of an acceptable part or otherwise, allowing for tolerated inaccuracies it is a question of a reject, which is to be treated accordingly. The disadvantage of the known method is that in the case of this method all departures from the shape of the master are taken in principle to be equivalent. If the tested parts for example have a screw thread, and more particularly a precision screw thread, same will only affect the shape to an extremely small extent and the tolerated inaccuracy will have to be very considerably reduced for the presence of the screw thread to be detected at all. For the identification of faults in screw thread a further reduction of the limits tolerated is necessary. If however the limits tolerated are overly reduced, even minimum departures in alignment may lead to rejection so that examination of such structures is not possible in practice. The same will apply for example for small holes, filleted intersections or the like. A further disadvantage of the known method is that for the comparison of surface structures and to achieve a good resolution an extremely large memory is required and the comparison operations require a relatively long time. The evaluating equipment needed is accordingly elaborate and expensive.

One object of the present invention is to create a testing method of the type initially mentioned with the aid of which extremely fine structures as well may be reliably identified in a relatively simple fashion and a suitable apparatus for the performance of the method.

This object is to be attained in the invention by deriving a plurality of individual criteria, the overall length, the overall height, the area, the axial alignment, the surface waviness, the position of the center of gravity, from the camera image signal, representing the shape of the respective part, and in that these individual criteria are compared with the individual criteria derived from at leas, master part

SUMMARY OF THE INVENTION

The method of the invention offers the advantage that it is now not necessary for all image points of a reject structure to be compared with each other, and it is only the values of the individual criteria derived from the image signal and employed as test criteria which must be compared. There is consequently a reduction in memory requirement and in the complexity needed for comparison as compared with conventional systems. Since these individual criteria identify and test the typical and significant features and structures of the part to be examined, all in all a reliable identification is performed. Significant criteria, which are however small as regards departure in area, as for example screw threads, may be reliably identified thereby, for example by the selection of surface waviness as an individual criterion. By making a skillful selection of the individual criteria it is possible for small elements and fine structures to be individually tested and identified.

The basis of the invention is in this respect that only the marginal parts of areas are relevant for identification and examination, not the full areas themselves lying in between, which accordingly do not have to be tested.

Further advantageous developments of the method of claim 1 are defined in the dependent claims, and an advantageous apparatus for the performance of the method will be defined.

More particularly by different weighting of the individual criteria it becomes possible to reliably identify details which only have a minor effect on the overall shape but which are extremely significant as such.

Owing to the possibility of pre-selecting such individual criteria it is possible to take into account the respective particularities of a part and to optimize identification.

Furthermore for the identification of significant details it is an advantage to divide up the image signal into different portions, each of such portions being evaluated independently of the others as regards the individual criteria. Preferably in this respect the portions are also differently weighted so that even finer and more exact adaptation to the respective particularities of a part becomes possible.

The different weighting of the individual criteria and/or portions is best made adjustable in order to be able to perform optimum adaptation.

For the acquirement of comparison data at least one master part may be subjected to a learn process, the corresponding image signal or the individual criteria derived therefrom being stored in order to be available in the operating mode for comparison.

For rapid adaptation and resetting for different parts to be tested a plurality of different master parts may be subjected to the learning mode, one of such master parts being able to be selected for the comparison. For changing over to another sort of parts to be tested, it is hence only necessary to operate a switch over key, if the other part has already been learned.

By multiple learning of each master part in the learn mode or by learning a plurality of master parts of the same type one after the other an inaccuracy tolerance range may be preset, since all such master parts are to lie in this tolerance range. For example by slight changes in the orientation of the multiply stored or learned master part those changes in orientation may be learned as well, which are to be within the tolerance range.

In the operating mode the sensitivity (tolerance) in identification may be set in at least one stage so that for example a plurality of different quality stages may be preset and sorting of the parts in several sorts is possible, for which the different tolerance conditions can be preset.

Parts to be removed as rejects are best removed from the conveyor means by blowing using at least one compressed air blast. If multi-stage sorting in accordance with different criteria is to take place, the parts on the conveyor means will preferably move past several air blast clearing stations, which remove the parts in accordance with different criteria.

The parts to be removed at one air blast clearing station at least and/or the parts which are not removed are best counted using a counter device in order for example to determine when a desired number of satisfactory parts has been reached.

The counter device may with advantage also be so operated that after reaching a predetermined number of satisfactory parts and/or reject parts the conveyor means and/or a supply means leading to the conveyor means, such as a sorting and straightening up station, is automatically turned off. Furthermore a following machine, as for example a packaging machine, can then be switched off or switched on again, when after a predetermined number of satisfactory parts a package is filled so that the next package can be offered.

As a camera it is best to employ a line camera. This means that there is the advantage that line orientated processing becomes possible, i. e. after each line has been registered corresponding computation and evaluation may take place. Accordingly the evaluation is terminated after the last line has been responded. An evaluation of the overall shape is then unnecessary. Therefore a rapid evaluation is possible with a small memory requirement.

In the case of an advantageous apparatus for the performance of the method in accordance with the invention at least the conveying means and the camera constitute an assembly unit, in which they have a fixed spatial relationship to one another, such assembly unit being arranged in common assembly holder. In this apparatus it is accordingly merely necessary for the common assembly holder to be fixed at a suitable point, no adjustment operations being necessary, because the camera and the conveying means are already set in a fixed spatial relationship on the assembly holder. Immediately after fixation of the assembly unit the apparatus in accordance with the invention is therefore fit for use and a start may be made with the examining operations intended. This apparatus may also in an advantageous fashion be utilized in connection with other examining methods for parts.

The conveying means preferably includes a conveyor belt, the camera preferably being arranged on one side of the conveying means and an illuminating means being arranged on the opposite side thereof in order to obtain images with backlighting, it being possible to cut out other interfering lighting effects.

In order to be able to completely examine the parts at an optimum angle, the camera is best arranged at such an angle to the load surface of the conveyor belt that the bottom limiting line of the image angle range of the camera essentially extends along the load surface.

In order to facilitate operations and for maximum variability of assembly the assembly holder possesses an assembly base provided with a holding rod, on which the conveying means, the camera and more especially the illuminating means are fixed. A removable housing, through which the conveying means extends, contains all components of the apparatus apart from the evaluating means so that on the one hand such accommodated components are protected and on the other hand the result of measurement is not affected by incidence of light from the outside.

A drive motor for the conveying means is best arranged to the side of the conveying means and to the side of the camera in order to ensure a compact arrangement. In order to change the direction of conveying together with the drive motor fixed thereon and the illuminating means the conveying means is so arranged in a re-settable manner that after each rearrangement the top side and the bottom side and furthermore the right hand and the left hand conveying portion are changed over and the drive motor is arranged on the opposite side of the camera so that the same housing may still be employed.

In accordance with an advantageous development the conveying means possesses a more particularly rail-like cover arranged parallel to it, such cover possessing at least one reject removal station, whose air nozzle are directed from the side toward the conveying means for parts which are to be removed. Each removal station in this case comprises preferably several more particularly superposed compressed air nozzles. It is in this manner that the removal stations are integrated in a compact arrangement and protected against contamination by dirt.

The rail-like cover is preferably able to be mounted on both flat sides of the conveying means in order to be able to be replaced on the top side following changing the conveying direction.

In order for example to be able to convey and examine round or rounded parts, the conveying means is so inclined to the side that the conveyed parts are moved along the i rail-like cover.

The control valves for the compressed air fed to the air blast nozzles are protected in the accommodating rail-like cover or in the conveying means against dirt and furthermore do not constitute and danger of injury.

The evaluating device may with advantage connected via a flexible cable bundle with the assembly unit so that this evaluating device also serving as a control device may be arranged or, respectively, mounted at any position.

The evaluating device may with advantage be adapted to serve for control of the conveying means, for receiving and evaluating the camera signals and preferably also for control of the at least one reject removal station. Furthermore the reject removal means preferably possesses counting means for the satisfactory parts and/or the rejected parts.

Moreover the evaluating means can with advantage comprise means for automatic switching off of the conveying means and/or of a supply means of the conveying means on attaining a predetermined number of satisfactory parts and/ or rejects. Furthermore it is an advantage for the entire apparatus to be designed as a sorting station for the sorting of differently supplied parts.

BRIEF DESCRIPTION OF THE DRAWINGS

A convenient apparatus for performing the method of the invention is represented in the drawings and will be described in more detail in the following account.

DETAILED DESCRIPTION OF THE INVENTION

Figure 1:
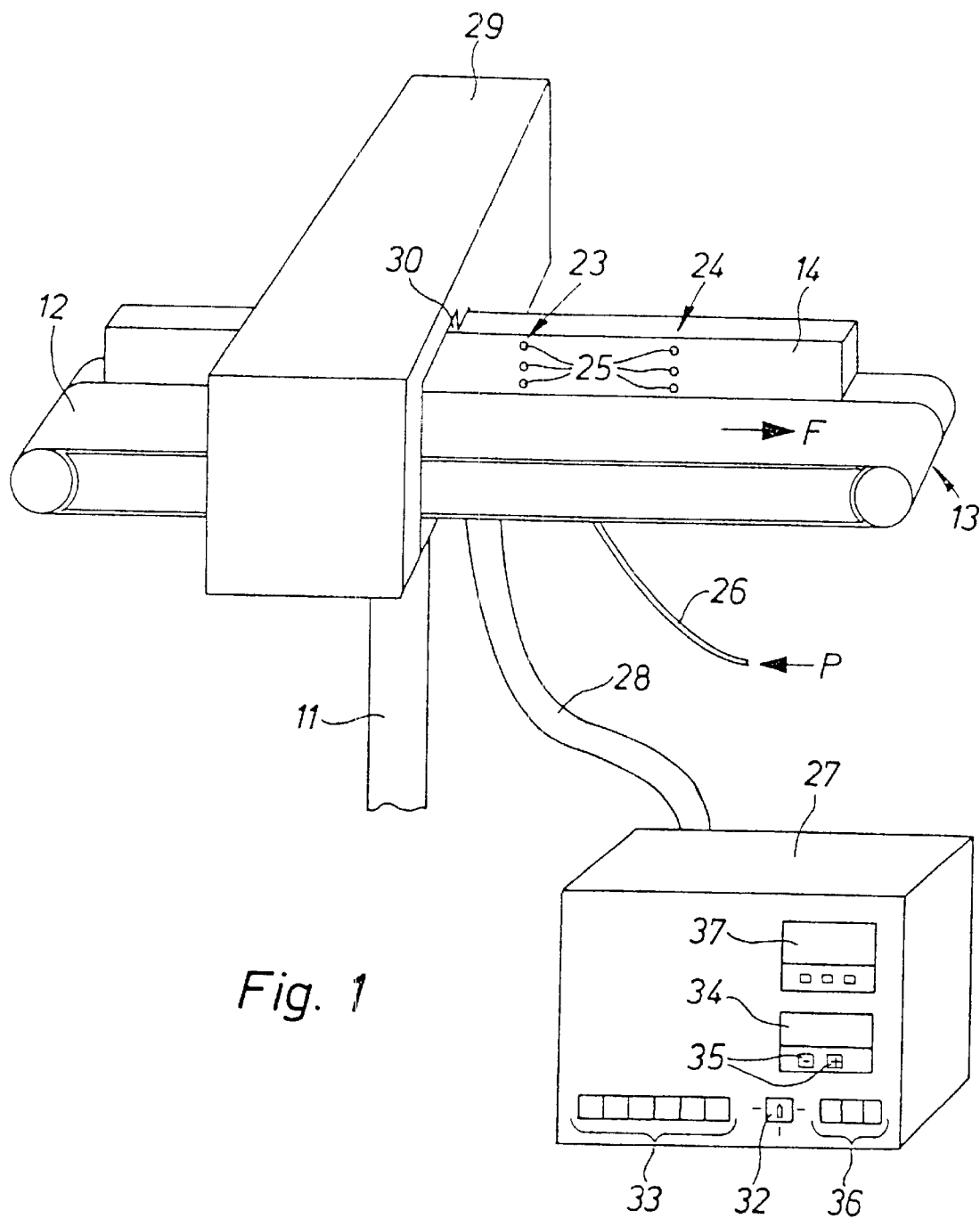
FIG. 1 is a perspective elevation of a mechanical and optical device for the performance of the method of the FIG. 2 shows a plan view of the central portion having the camera for registering the parts moving past.
Figure 2:
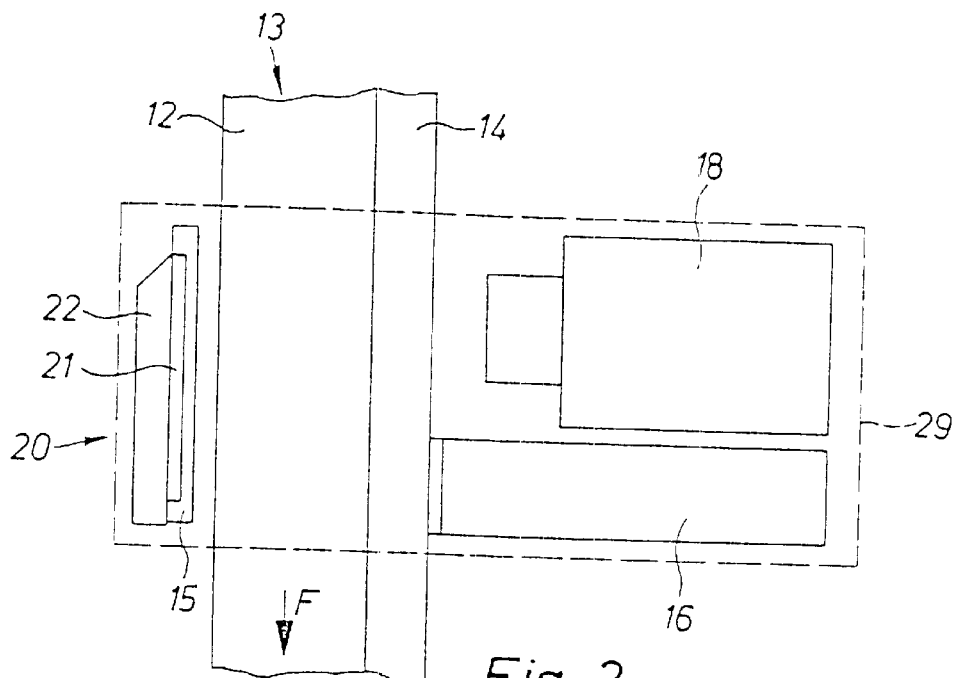
Figure 3:
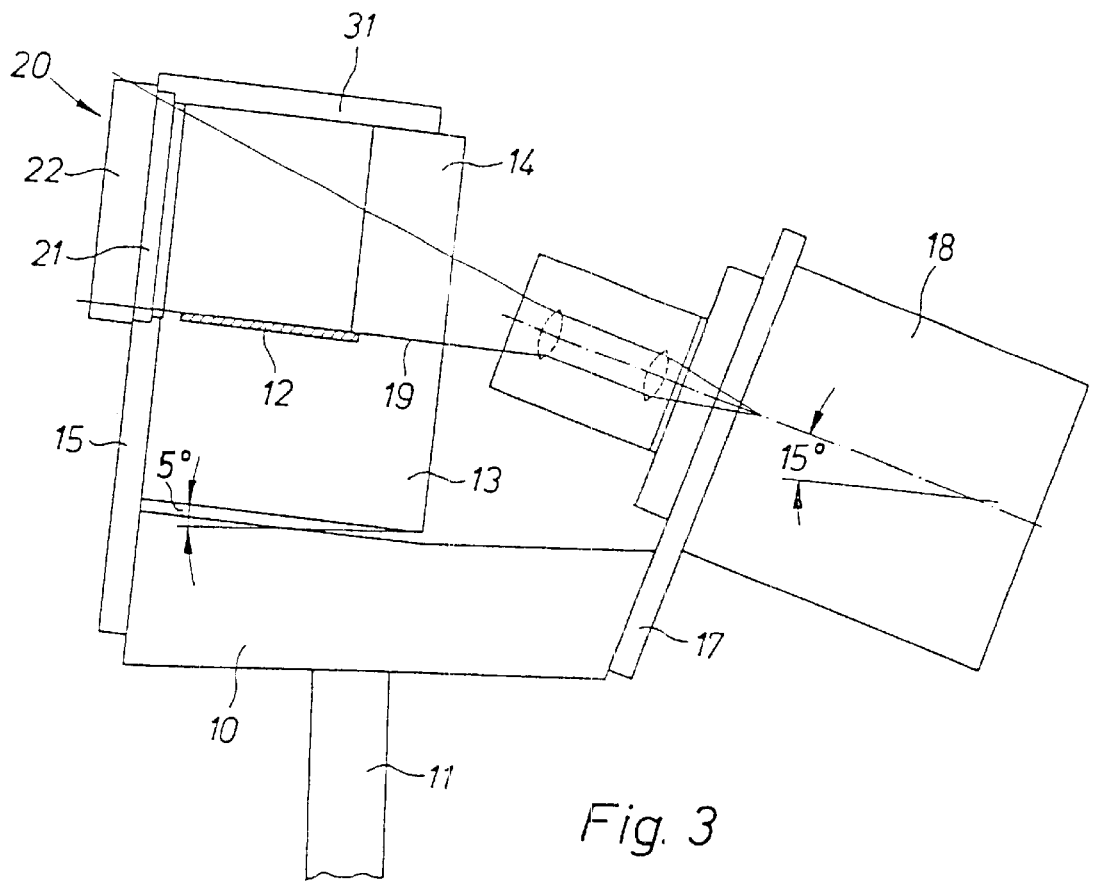
FIG. 3 shows the portion having the camera in a side view.

In the case of the embodiment of the invention represented in FIGS. 1 through 3 a common assembly base or assembly block 10 is held on an assembly rod 11 extending therefrom downward, such rod enabling the entire arrangement to be mounted in any desired fashion on machines, in the case of which parts leaving or arriving at such machines are to be examined as to whether as regards the dimensions and orientation thereof they comply with a predetermined master or pattern within a given tolerance range.

It On the assembly block 10 as a conveying means a substantially horizontally extending conveyor belt means 13 is mounted to serve as an endless circulating conveyor belt 12. As shown in FIG. 3 the conveyor belt means 13 is inclined slightly athwart the longitudinal direction, such inclination in the illustrated working embodiment being around 5° so that the parts to be examined may be moved along a rail-like cover 14 extending laterally upward from the lowest point on the conveyor belt 12. This may be necessary in the case of round parts such as screws or the like. It is naturally also possible to arrange the conveyor belt means 13 to be exactly horizontal. The conveyor belt means 13 is in this case attached on an assembly plate 15 projecting upward to the side of the assembly block 10. A drive motor 16 for the conveyor belt means 13 projects athwart the conveying direction F in opposite to the assembly plate 15 to the side of the conveyor belt means 13.

Opposite to the section plate 15 for the conveyor belt means 13 there is a further assembly plate 17 fixed to the assembly block 10, on which a camera in the form of a line camera 18 is mounted. The camera 18 is in this case so inclined toward transverse direction of the conveyor belt means 13 (in the embodiment of the invention the angle of inclination amounts to 15°) that the bottom limiting line 19 of the image angle portion of the camera 18 is in the plane of the conveyor belt 12 so that parts being conveyed on such conveyor belt may be exactly and completely responded to by the camera.

On the section plate 15 holding the conveyor belt means 13 furthermore an illuminating means 20 is arranged. For this purpose an essentially rectangular glass sheet 21 is held on or in the assembly plate 17, this glass sheet having on the side opposite to the camera 18 a flat illuminating box 22 with a lamp arrangement, not illustrated, fixed to the glass sheet 15. A reflecting mirror or a diverting prism in the interior of this illuminating box 22 serves to divert the light toward the camera so that the shapes of the parts respectively moving past may be responded to by the camera with a backlighting effect.

For illumination LEDs are provided in the illuminating means 20, which on the one hand have a long working life and on the other hand possess a narrow light frequency range. This means that for example the camera may be provided with a suitable band filter, which essentially only permits the passage of the wave length range of the LEDs so that all undesired incident light from the outside or other light sources may be cut out in a simple manner. The arrangement is accordingly made insensitive to interfering light sources.

On the rail-like cover 14 two rejection or removed stations 23 and 24 are provided. In the illustrated working embodiment same comprise respectively three superposed clearing nozzles 25, the number of such clearing nozzles 25 naturally being able to be freely selected. The number of reject removal stations 23 and 24 will also naturally be dependent on the respective requirements. The air blast clearing nozzles 25 are connected via control valves, not illustrated, and via a compressed air line 26 with a source of compressed air, not illustrated. The control of the control valves is performed using an electronic control and evaluating means 27, which is connected by means of a cable hose 28 with the assembly unit. On supply of compressed air to the clearing nozzles 25 the lateral pressure jets then produced will clear the respectively passing part to the side off the conveyor belt 12 so that same is removed. The control valves may then for example be-arranged on the rail-like cover 14 or in the conveyor belt means 13. In the rail-like cover it is furthermore possible to provide a choke, not illustrated, for the regulation of the compressed air jets, such choke being for example adjusted by means of a rotary knob or an adjustment means. With the aid of such choke it is possible for the air jets to be optimized, i. e. for light plastic parts the air jet will be set to be relatively weak, whereas in the case of relatively heavy metal parts it will be set to be stronger.

In the position illustrated in FIG. 1 the conveying means runs from the left to the right. The right hand portion of the conveyor belt means 13 as from the camera 18 is substantially longer than the left portion, since the reject removal stations 23 and 24 are arranged on it. For many applications an opposite conveying means is necessary so that an the left hand portion, starting at the camera, of the conveyor belt means 13 must be the longer portion provided with the reject removal stations 23 and 24. In such a case housing 29, which covers over the camera 18, the drive motor 16 arranged to the side thereof and the illuminating means 20, will be removed in an upward direction. At its two vertical longitudinal walls this housing possesses two recesses 30, through which the conveyor belt means 13 extends athwart the longitudinal direction of the housing 19. The housing 29 is mounted on a holding plate 31, which connects the top end part of the assembly plate 15 and, respectively, the illuminating means 20 with the top end portion of the rail-like cover 14. Assembly means, such as screws or other clamping and fastening means needed are omitted from the drawing for simplification. When the housing is removed the conveyor belt means 13 is released and pivoted through 180° so that the side which has so far been the top side is now the bottom side and the left hand and I right hand end portions are changed over. The previously removed rail-like cover 14, now correspondingly pivoted around, is mounted on the top side of the conveyor belt means 13 to the side of the conveyor belt 12 so that the reject removal stations 23 and 24 are now arranged on the opposite side to that illustrated in FIG. 1. The positions of the camera 18 and of the drive motor 16 are now changed over, for which purpose both the camera 18 and also the illuminating means 20 must be correspondingly offset.

The entire assembly unit arranged on the assembly block 10 and, respectively, the assembly rod 11 is now completely adjusted for use and may in case of need be mounted without additional adjustment work at the respectively required position. For example, the conveying means may have an alignment or straightening station arranged preceding it, by which the parts to be examined are aligned in a predetermined manner when they pass onto the conveyor belt 12 and are moved past the camera for examination. Given a correct orientation of the parts and a correct, accurate size thereof, such parts will for example pass at the end of the conveyor belt to an assembly station, a further processing station or to a packaging station. Parts departing as regards their configuration or alignment from a master in the case of a given tolerance will be treated as rejects and removed by the air blast to the side using the reject removal station 23. For example only parts will be treated as satisfactory parts which fulfil tight tolerance criteria.

The first air blast removal station will remove such parts which although they are not within the tight tolerance criteria, are still within wider tolerance criteria. Such parts may be treated as seconds or be pre-sorted again or be subjected to basic processing again. Parts which are outside the wider tolerance range will be removed as rejects by means of the second removal station 24.

It is also possible to utilize the camera to perform a further degree of sorting such that although a part is identified as satisfactory part, it is identified as having a faulty orientation. Such parts may then be removed using the removal stations 23 and 24 and passed back to the straightening station.

The control and evaluating means 27 possess an operating switch 32, by which switching over between a learn mode, a selection mode and an automatic mode is possible. Firstly master parts must be learned. For this purpose the operating switch 32, which for example is in the form of a key-and-lock switch, is set in the learn mode position. Now a memory is selected by operation of one of six memory keys 33. Such memory keys are for example designed in the form of illuminated keys. Then in the learn mode a master part is caused to pass by the camera 18 several times using the conveyor belt 12. Alternatively several master parts of the same type can be moved past. The camera 18 responds each time to the shape of the respective part which is backlighted. These shapes are now evaluated in the control and evaluating means 27.

For this purpose from such shape individual criteria are gained, such criteria being for example overall length, area, axial alignment, surface waviness, position of center of gravity and such data is stored. These individual criteria are either already preset or it is possible to make a selection from a predetermined number of certain individual criteria for a respective part. More particularly in the case of large parts it is possible for the shape detected also to be divided up into portions or for each portion the individual criteria to be separately evaluated, in which respect different weightings both of the individual portions inter se and also of the individual criteria inter se are possible. The selectability of the individual criteria, the division up into portions and the weighting of individual criteria and portions may be preset or may be adjustable. For this purpose, dependent on the design on the control and evaluating means 27 further adjustment devices, not illustrated, are arranged. Owing to the repeated passage of one or more master parts the spectrum of the features to be considered satisfactory is coped with, i. e. the control and evaluating means 27 evaluates all such parts as still being within a tolerance range and accordingly establishes a tolerance band. The individual criteria to be evaluated therefore comprise respectively different tolerance ranges. On an LCD display means 34 it is possible for the distribution of the features to be reproduced. In the case of six memory keys 33 provided it is possible in this manner for six different master parts to be learned, such number being able to be changed in accordance with the number of memory keys and the necessary memory means as well.

In a modified learn mode it is also possible to firstly learn one reject part or several reject parts in accordance with different master parts. The control and evaluating means 27 then automatically detects the distinguishing features of the master parts and the reject part or parts and such differences are then particularly evaluated in later examination. In this respect it is possible, if only a certain portion is particularly different, to evaluate the features of this portion to a greater extent. Such an automatic learn mode saves programming time and facilitates the use of the device of the invention.

For selection between the stored values the operation change over switch 32 is set in the selection mode setting. After this the memory key 33 corresponding to parts to be examined is operated. It is now possible to reset the sensitivity and, respectively, tolerance by means of the sensitivity keys 35 arranged underneath the LCD display means 34. For this purpose different test examinations are performed by the return of a number of parts to be examined to examination just for testing. It is then individually possible to reduce or increase the permissible tolerance with the aid of the sensitivity key 35. After the conclusion of setting the operation switch over switch 32 is returned to the automatic mode setting and the examination as such may be commenced. For this purpose just like the learning mode on the passage of each part the shape is registered and therefrom the individual criteria are derived. Same are then compared with the stored individual criteria of the master part. If all individual criteria are within the set tolerance range such part is identified as a satisfactory part, but otherwise as a reject part, intermediate stages being possible for differentiation. Removal is affected by means of control signals by means of the control and evaluating means 27, which supplies the signals to the control valves of the removal stations 23 and 24.

Three operating keys 36 in the form of illuminated keys for example serve to start and stop the conveyor belt means 13, the measuring operation being simultaneously turned on or off, providing the necessary steps have been performed previously. One of the operating keys 36 is in the form of a status key, which for example is illuminated on passage of a satisfactory part in order to document proper functioning. Trouble conditions can also be indicated by rapid blinking of such illuminated keys and/or display of an error code on the LCD display means 34. After a trouble condition has been dealt with it is possible, by operation of the status key, to obtain confirmation that the error has been dealt with, following which the error code displayed will disappear again.

The control and evaluating means 27 may also serve for the control of devices connected with the input or output of the system. For example it is possible for a straightening means, placed at the input, to be supplied with operating power via the control and evaluating means 27. On the occurrence of a trouble condition or on switching off of the conveyor belt means 13 the preceding station is then automatically switched off as well so that no further parts are supplied. Furthermore it is possible for the control and evaluating means 27 to be provided with a diagnostic interface for the connection, for example, of a laptop in order to be able to perform checking and to deal with trouble condition on the examination device.

The control and evaluating means 27 is furthermore also provided with a counting means 37, with which satisfactory parts and/or reject parts may be counted, the counting of the reject parts again being able to serve for putting the reject parts in different categories as further differentiation. With the aid of such counting means 37 it is also possible for example to preset a given number of satisfactory parts.

When this number is reached, the examination device is then automatically turned off together with the machine on the input side supplying the parts.

The device described may also be utilized for sorting different parts. For this purpose the conveyor belt means 13 receives the different parts placed on it, which are then identified by means of the camera 18 after suitable evaluation. Removal is then performed using the removal stations 23 and 24, i. e. for four different sorts of parts four removal stations are necessary, the parts placed in one respective sort being blown or blasted away by the respective removal station into a receiving container. One sort or the parts seen to be rejects, which are not to be placed in any one of the four sorts or categories, are then removed at the end of the conveyor belt 12.

It is also possible to form a packaging unit of different parts in a predetermined manner. A packaging unit may for instance consist of four parts of sort number 1, two parts of sort number 2 and one part of sort number 3. The parts are then supplied unsorted in no particular order to the conveyor belt means 13. By means of the camera and the evaluating means the parts of the sorts numbers 1, 2 and 3 are then identified in the manner already described and other parts or reject parts are removed. In this respect it is only a question of the dimensions and not of the orientation of such parts so that the individual criteria may be selected accordingly.

At the end of the conveyor belt means 13 bags for packaging, for example, are supplied at the side. After one part of the sort number 3 has moved past further parts of the sort number 3 are removed and returned to the return means, if there are not enough parts of the sorts number 1 and number 2 for the packaging unit intended. Accordingly satisfactory parts are removed and returned until all desired parts have been supplied in the desired number to the packaging unit. Then at the end of the belt there is a change over to the next package and the operation is performed again.

If parts are to be identified on a three-dimensional basis, instead of the line camera so far described a three-dimensional camera is employed, or two cameras are arranged for example set at a right angle to each other.

What is claimed is:

1. A method for the identification of respective parts as being at least one of incorrectly oriented parts and parts departing from a user-determined type of master part, the method comprising the steps of:

moving the respective parts past at least one camera for registering shapes of the respective parts by a conveyor means, given differences from stored master values the respective parts being at least one of identified as being faulty and removed;

deriving from an image signal of the camera corresponding to the shape of the respective part, several individual criteria including at least one of overall length, overall height area, axial alignment, surface waviness, and position of center of gravity;

comparing the individual criteria with corresponding individual criteria derived from at least one master part, the at least one master part being able to be learned in a learn mode;

storing at least one of a corresponding image signal and the individual criteria derived from the at least one master part to be available for comparison to the respective parts during an operating mode;

selecting in the operating mode one type of master part for comparison with the respective parts, a tolerance being able to be adjusted during the identification of the respective parts as being at least one of incorrectly oriented parts and parts departing from a user-determined type of master part in at least one stage or continuously during the operating mode.

2. The method as claimed in claim 1, wherein the individual criteria are at least one of differently weighted and pre-selectable.

3. The method as claimed in claim 1, wherein the image signal is divided up into different portions, the portions being at least one of evaluated independently of each other as regards the individual criteria and differently weighted.

4. The method as claimed in claim 2, wherein the different weighting is able to be adjusted.

5. The method as claimed in claim 1, wherein at least one of each master part is learned a plurality of times in the learn mode, a plurality of master parts of the same sort are learned in sequence, and master parts and reject parts are learned.

6. The method as claimed in claim 1, wherein the parts to be removed are cleared by an air blast from at least one jet to remove same from the conveying means, the parts passing on the conveyor means moving past a plurality of removal stations, which remove the parts in accordance with different criteria.

7. The method as claimed in claim 6, wherein criteria for the removal includes at least one of failure to comply with at least one tolerance range, faulty orientation, and the sorting of different types of satisfactory parts.

8. The method as claimed in claim 1, wherein at least one of parts removed at a removal station and parts not removed are counted by means of a counting means and upon reaching a predetermined number of at least one of satisfactory parts and reject parts at least one of the conveyor means and a supply means leading to the conveyor means is turned off.

9. The method as claimed in claim 1, wherein said camera is in the form of a line camera, a response to the shapes being made in a line-orientated manner.

10. The method as claimed in claim 1, wherein at least one of two cameras and a three-dimensional camera are employed for three-dimensional registration of the respective parts.

11. A method for the identification of parts differing from a user-determined type of master part and incorrectly oriented parts, the method comprising the steps of:

moving the parts past at least one camera for registering a shape of the parts by a conveyor, given differences from stored master values the parts being at least one of identified as differing from the user-determined type of master part, identified as being incorrectly oriented, and removed;

deriving from an image signal of the camera corresponding to the shape of the part at least one individual criteria including at least one of overall length, overall height area, axial alignment, surface waviness, and position of center of gravity;

comparing the individual criteria with corresponding individual criteria derived from at least one master part, the at least one master part being able to be learned in a learn mode;

storing at least one of a corresponding image signal and the individual criteria derived from the at least one master part to be available for comparison to the parts during an operating mode;

selecting in the operating mode one type of master part for comparison with the parts; and identifying the parts as being at least one of incorrectly oriented and departing from a user-determined type of master part, a tolerance being able to be adjusted during the identification of the parts during the operating mode.

12. The method as claimed in claim 11, wherein the individual criteria are at least one of differently weighted and pre-selectable.

13. The method as claimed in claim 11, further comprising the step of dividing the image signal into different portions, the portions being at least one of evaluated independently of each other with respect to the individual criteria and differently weighted.

14. The method as claimed in claim 12, further comprising the step of adjusting the weighting.

15. The method as claimed in claim 11, further comprising at least one of the steps of:

learning the at least one master part a plurality of times in the learn mode;

learning a plurality of master parts of the same type; and learning faulty parts.

16. The method as claimed in claim 11, further comprising the step of clearing the parts to be removed by an air blast from at least one jet at a removal station for removal of the parts from conveyor in accordance with different criteria.

17. The method as claimed in claim 16, further comprising the step of removing parts in accordance with criteria including at least one of failure to comply with the tolerance, incorrect orientation, and differing from the user-determined type of master part.

18. The method as claimed in claim 11, further comprising the steps of:

counting at least one of parts removed at a removal station and parts not removed at the removal station; and turning at least one of the conveyor and a supply means leading to the conveyor off upon reaching a predetermined number of at least one of satisfactory parts and faulty parts.

19. The method as claimed in claim 11, further comprising the step of responding to the shapes of the parts in a line-oriented manner by the camera.

20. The method as claimed in claim 11, further comprising the step of providing at least one of two cameras and a three-dimensional camera for registration of the parts.

* * * * *

UNITED STATES PATENT AND TRADEMARK OFFICE
CERTIFICATE OF CORRECTION

PATENT NO. : 6,687,398 B1
DATED : February 3, 2004
INVENTOR(S) : Kriwet et al.

It is certified that error appears in the above-identified patent and that said Letters Patent is hereby corrected as shown below:

Column 2,
Line 5, "at leas, master part" should read -- at least, master part. --

Column 4,
Line 37, "along the i rail-like" should read -- along the rail-like --

Column 5,
Line 19, "It On the assembly block 10" should read -- On the assembly block 10 --

Column 6,
Line 17, "example be-arranged" should read -- example be arranged --
Line 50, "left hand and I right" should read -- left hand and right hand --

Signed and Sealed this

Twenty-fifth Day of May, 2004

JON W. DUDAS
*Acting Director of the United States Patent and Trademark Office*